United States Patent
Hunter

[11] 3,724,487
[45] Apr. 3, 1973

[54] BACKFLOW PREVENTING VALVE CONSTRUCTION

[75] Inventor: Edwin J. Hunter, Riverside, Calif.

[73] Assignee: Toro Manufacturing Corporation, Riverside, Calif.

[22] Filed: Oct. 19, 1971

[21] Appl. No.: 190,531

[52] U.S. Cl. ............................................. 137/218
[51] Int. Cl. ............................................. F16k 1/12
[58] Field of Search ..................... 137/218; 251/61.4

[56] References Cited

UNITED STATES PATENTS 3,498,310   3/1970   Hechler........................... 137/218 X Primary Examiner—Henry T. Klinksiek
Attorney—C. A. Miketta et al.

[57] ABSTRACT

This valve is constructed of a multiplicity of molded parts joined by a variable number of bolts into a body with an inlet passage opening to an intermediate chamber via an inlet check valve with wedging sealing action; with the intermediate chamber opening to an outlet passage via an outlet check valve with wedging sealing action; with a diaphragm chamber having a diaphragm therein to divide the chamber into an inlet pressure portion opening to the inlet passage via a interconnecting passage, and into an intermediate pressure portion opening to the intermediate chamber; and with an exhaust passage opening to atmosphere and to the intermediate chamber via a relief valve connected by a spring to the diaphragm whereby fluid normally flows from the inlet passage through the intermediate chamber to the outlet passage but upon attempted backflow of the fluid, the check valves close to prevent such backflow and upon failure of the outlet check valve, the diaphragm flexes to open the relief valve to vent such backflowing fluid, and before failure of the outlet check valve, the spring between the diaphragm and the relief valve compensating for slight flexing of the diaphragm to maintain the relief valve closed and prevent fluid spitting due to slight changes in the pressure of the incoming fluid.

22 Claims, 7 Drawing Figures

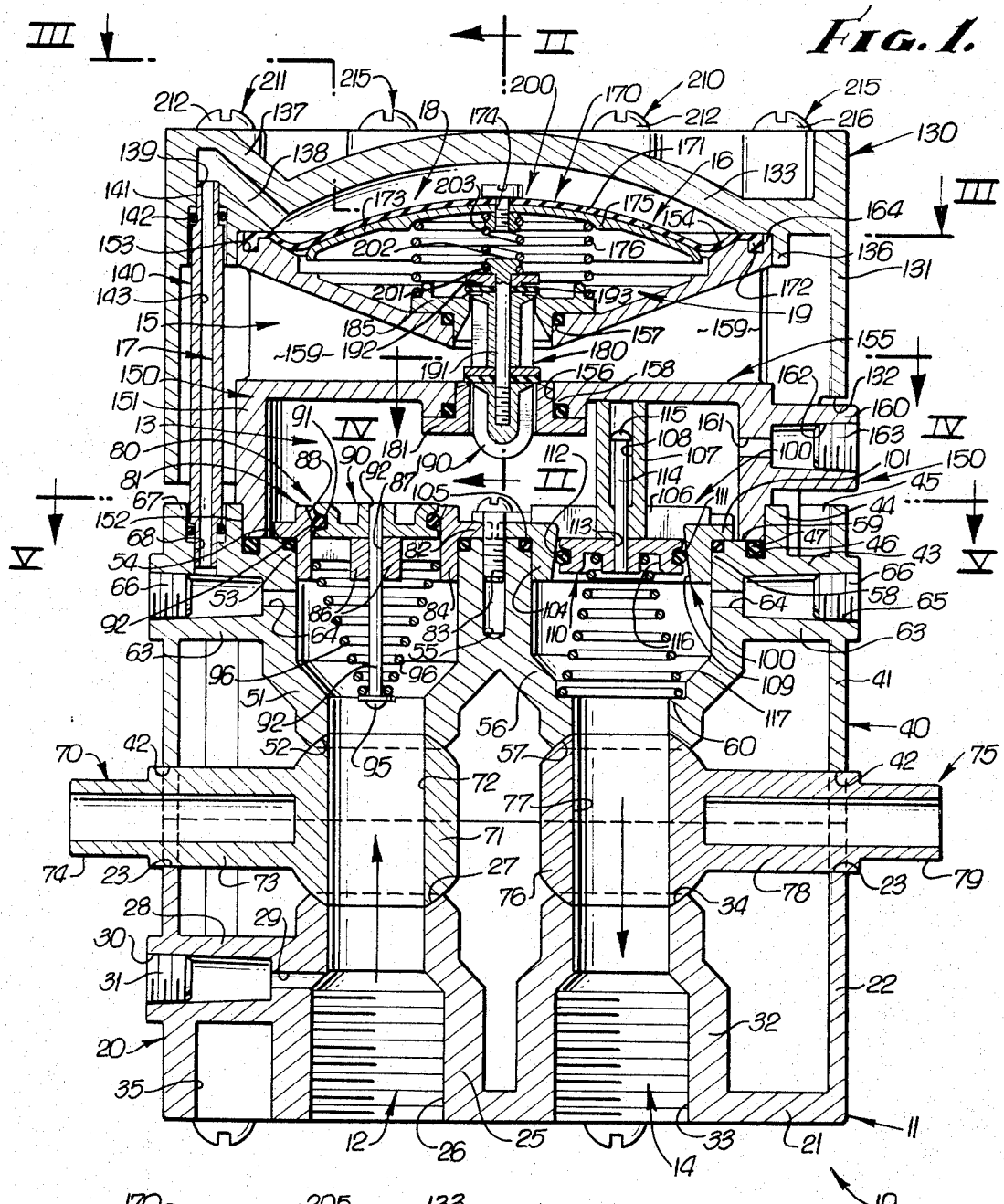

INVENTOR.
EDWIN J. HUNTER
By Miketta, Glenny, Poms & Smith
ATTORNEYS.

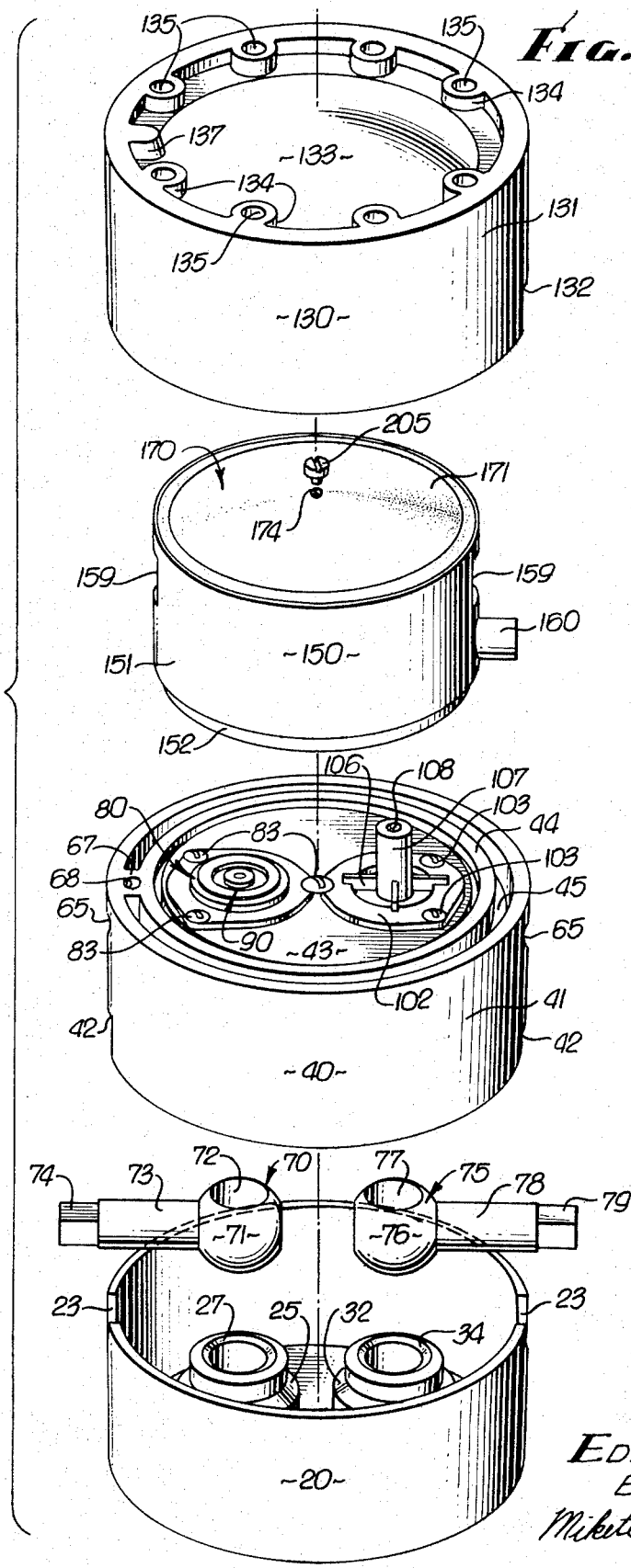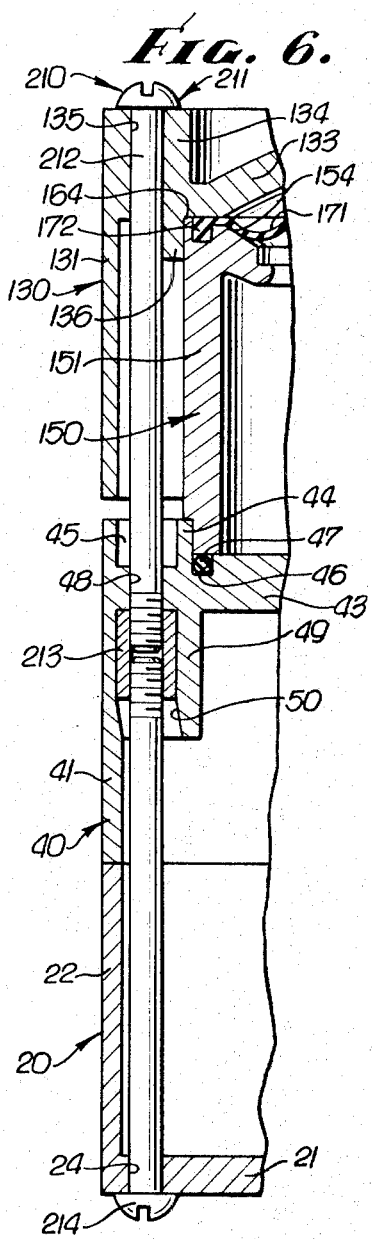

3,724,487

BACKFLOW PREVENTING VALVE CONSTRUCTION

BACKGROUND OF THE INVENTION

This invention relates to valves and valve constructions and more particularly to such valves which prevent backflow to avoid contamination of the supply fluid.

In the prior art there are backflow preventing valves which prevent the flow of fluid from the outlet passage thereof back to the inlet passage, even under conditions which would normally cause fluid backflow such as back pressure or back siphonage. Such valves have heretofore been used primarily in water systems where potable water is used not only for human consumption but also for other purposes, such as a plumbing system in a high rise building. However, the high cost of making these prior backflow preventing valves has greatly restricted and limited their use. Consequently, it has not been practical heretofore to attempt to provide lawn fertilizing apparatus in conjunction with the standard home watering system. If the expense of such valves could be substantially reduced without reducing the protection afforded the potable water supply, then such valves would have much wider application. For example, an inexpensive backflow preventing valve could be used in a system for spreading fertilizers and other chemicals onto a lawn through the lawn sprinkler system without fear of contaminating the house supply of water.

Another problem with the prior art backflow preventing valves is the noise and wetting caused when the relief valve is cracked open slightly due to incoming fluid pressure fluctuations, allowing fluid to spit through the exhaust passages thereof. This spitting is usually caused in the prior art backflow preventing valves by sudden pressure fluctuations in the water entering the valve and which forced the relief valve therein to crack open. Frequently such valves are located in proximity to living quarters and the aforementioned noise and wetting can be very objectionable. A backflow preventing valve which does not spit fluid and thus does not make objectionable noise and wetting upon sudden incoming fluid pressure changes would be a significant improvement in the art.

Yet another problem with the prior art backflow preventing valves is the limited useful life and sealing capacity of the check valves therein. These check valves are used to prevent backflow and must seal effectively to perform this function. As these valves open and close, the sealing surfaces thereof wear until the valve fails. A backflow preventing valve including improved check valves with longer lived, effective sealing surfaces would improve the backflow preventing valve art.

BRIEF DESCRIPTION OF THE INVENTION

Therefore, it is the primary object of this invention to provide a novel backflow preventing valve which has significant advantages not found in the prior art valves and overcomes the aforesaid disadvantages of the prior art backflow preventing valves.

Other and additional objects of this invention are to provide such a valve which accommodates sudden fluctuations in the incoming fluid pressure without the relief valve therein cracking open to permit the fluid to spit from the body causing objectionable noise; to provide such a valve which has improved check valves therein which effectively seal the internal portions of the valve body from one another; to provide such a valve which has a multiplicity of inexpensively molded parts which can be easily assembled; and to provide such a valve which has the parts secured together into a unit by fastening elements provided in a manner related to the pressure carried by the particular parts fastened.

Generally, the backflow preventing valve, according to this invention, includes a body having an inlet passage for connection to a source of fluid; an intermediate chamber fluidly connected to the inlet passage via an inlet check valve; an outlet passage fluidly connected to the intermediate chamber via an outlet check; an exhaust passage fluidly connected to the intermediate chamber via a relief valve and opening to atmosphere; a diaphragm chamber fluidly connected to the inlet passage and to the operating chamber; and a diaphragm in the diaphragm chamber to divide the diaphragm chamber into an inlet pressure portion and an intermediate pressure portion, said inlet pressure portion being in fluid communication with the inlet passage and said intermediate pressure portion being in fluid communication with the intermediate chamber, with the improvement comprising the provision of a resilient connecting means between the diaphragm and the relief valve for operably connecting the relief valve to the diaphragm while allowing slight relative movement therebetween, whereby upon sudden fluctuations in the fluid pressure in the valve housing, the diaphragm can flex slightly without moving the relief valve, but upon a leak of fluid from said outlet passage into said intermediate chamber, the diaphragm flexes beyond the limited amount allowed to move the resilient connecting means and permit the relief valve to open and exhaust the excess fluid without allowing backflowing fluid past the inlet check valve into the inlet passage and to thereby avoid possibly contaminating the inlet fluid supply.

The improvement may also preferably include the provision of check valves with a frustoconical sealing surface against which a sealing ring is wedged to seal the juncture between the valve seat and valve piston. The body is preferably constructed of a multiplicity of individual molded parts assembled together by holding elements to provide the required passages, chamber valves, etc. The number of holding elements may be matched to the expected load on the different molded parts.

BRIEF DESCRIPTION OF THE DRAWINGS

FIG. 1 is a vertical cross-sectional view of a preferred exemplary embodiment of backflow preventing valve, according to this invention.

FIG. 2 is an enlarged view taken along the plane II—II of FIG. 1, showing the construction of the relief valve and its connection by a resilient member (a spring) to a diaphragm of the backflow preventing valve.

FIG. 6 is a fragmentary side cross-sectional view taken along the plane VI—VI of FIG. 3.

FIG. 7 is an exploded perspective view of the preferred exemplary embodiment of backflow preventing valve of FIGS. 1 through 6, according to this invention.

DETAILED DESCRIPTION OF THE PREFERRED EMBODIMENT

Figure 3:
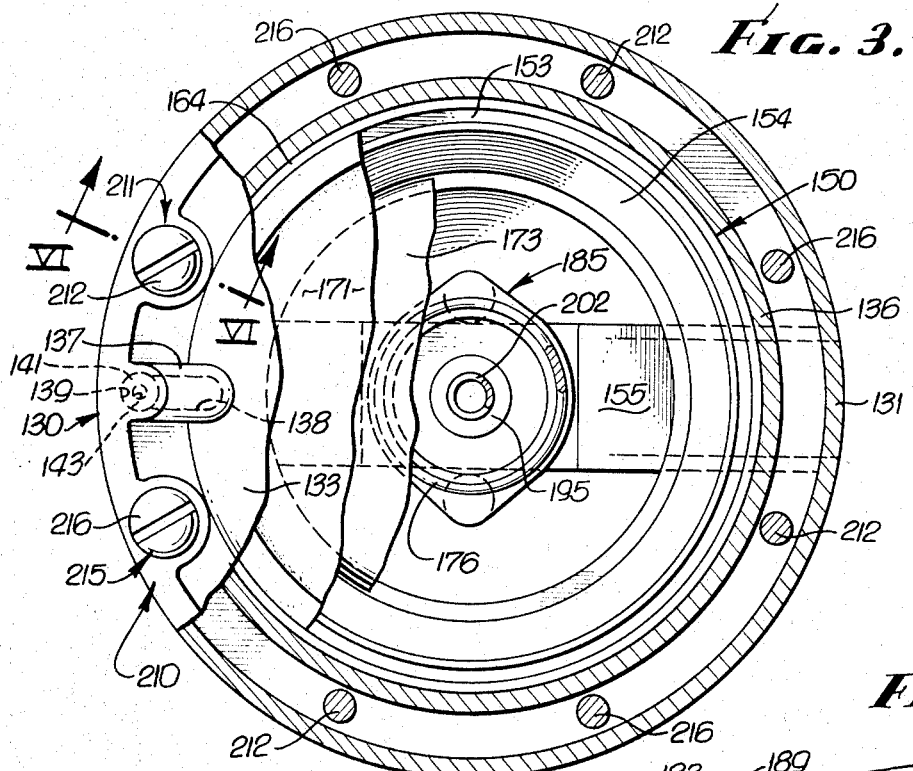
FIG. 3 is a top cross-sectional view taken along the stepped plane III—III of FIG. 1.

Referring now to the drawings and particularly to FIG. 1, the preferred exemplary embodiment of the backflow preventing valve, according to this invention, is generally denoted by the number 10. The valve 10 is for installation in a water or other fluid system having a source and a receiver which are to be kept separate except when there are suitable pressures to cause flow from the source to the receiver. An example of such a system would be a sprinkler system fed by house water, which includes apparatus for adding fertilizer or other chemicals to be fed in the water to the lawn while it is being sprinkled. Such fertilizer and other chemicals must be kept from contaminating the supply of the house water and so a backflow preventing valve 10 is required.

Generally, the backflow preventing valve 10 includes a body 11 having an inlet passage 12 for connection to a source of fluid (not shown); an intermediate chamber 13 fluidly connected to the inlet passage 12 via an inlet check valve 80; an outlet passage 14 fluidly connected to the intermediate chamber 13 via an outlet check valve 100 and for connection to a receiver of fluid (not shown); an exhaust passage 15 fluidly connected to the intermediate chamber 13 via a relief valve 180 and opening to atmosphere; a diaphragm chamber 16 fluidly connected to the inlet passage 12 via an interconnecting passage 17 and to the intermediate chamber 13, a diaphragm 170 in the diaphragm chamber 16 to divide the diaphragm chamber 16 into an inlet pressure portion 18 and an intermediate pressure portion 19. The improvements in the valve 10 include the provision of a resilient connecting means 200 between the diaphragm 170 and the relief valve 180 for operably connecting the two together; frustoconical sealing surfaces 88 and 109 on the inlet and outlet check valves 80 and 100 respectively; and a multiplicity of molded parts such as a lower barrel part 20, a case part 40, a diaphragm housing part 130, a diaphragm support housing part 150, with holding means 210 for holding the parts together.

The lower barrel part 20, according to this invention, is shown in perspective in FIG. 7 and is shown in vertical cross-section in FIG. 1. The lower barrel part 20, as are all the parts, is preferably molded from a suitable plastic material to reduce the cost of the valve 10. For large backflow preventing valves 10, the lower barrel part 20, and the other parts, could be made of brass or another easily worked material which has a higher strength than plastic. The lower barrel part 20 has a generally circular bottom wall 21 from which an upstanding cylindrical sidewall 22 extends. The upper edge of the sidewall 22 has a pair of oppositely spaced right and left notches 23. The bottom wall 22 has a series of peripheral holes 24 just inside the sidewall 22 and has a hollow left or inlet boss 25 protruding upwardly therefrom. The inlet boss 25 is internally threaded at the lower end 26 and has an upper or valve end 27 with a spherical surface. A transverse hollow boss 28 extends between the sidewall 22 and the inlet boss 24. The boss 28 has a passage 29 to the center of the inlet boss 25 and has internal threads 30 in the outer end which receive a plug 31 to temporarily close this boss. The bottom wall 22 also has a hollow right or outlet boss 32 protruding upwardly therefrom. The outlet boss 32 is internally threaded at the lower end 33 and has an upper or valve end 34 with a spherical surface. The lower barrel part 20 is completed by the provision of a drain hole 35 through the bottom wall 21 and is ready to be joined to the case part 40.

Figure 5:
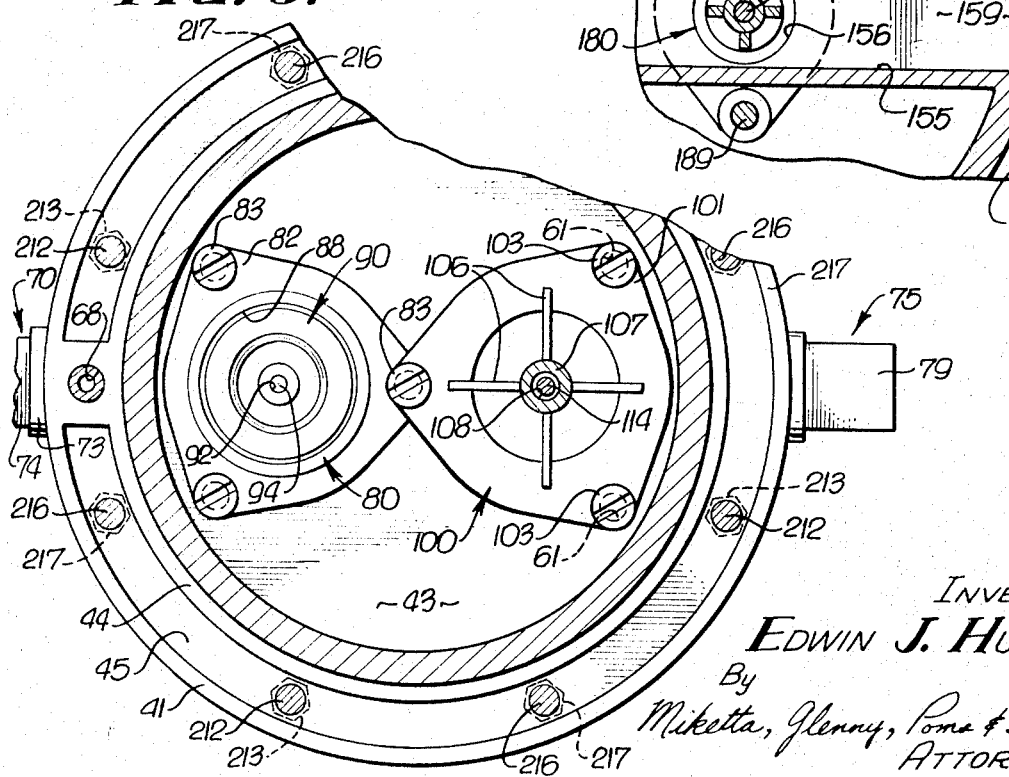
FIG. 5 is a fragmentary top cross-sectional view taken along the plane V—V of FIG. 1.

The case part 40 is shown in perspective in FIG. 7, is shown in vertical cross-section in FIG. 1, and is shown in top cross section in FIG. 5. The case part 40 is provided to join onto the barrel part 20. The part 40 has a cylindrical sidewall 41 with the same outside diameter as the sidewall 22 for edge to edge contact thereagainst. The sidewall 41 has opposed right and left notches 42 in the lower edge which will, together with notches 24, form right and left holes. Adjacent the upper edge of the cylindrical sidewall 41 is a transverse web 43. An inner cylindrical ridge 44 upstands from the web 43 closely adjacent the cylindrical sidewall 41 to form therebetween an annular groove 45. The web 43 also has an annular groove 46 therein, at the intersection of the ridge 44 for receiving a seal 47 therein for a purpose which will appear later. The web 43 is provided with a multiplicity of holes 48 which extend from the groove between the ridge 44 and sidewall 41 downwardly. Selected holes 48 extend to eight nut bosses 49 depending from the web 43 and having six sided nut cavities 50 formed in the lower end thereof. The web 43 has a hollow left or inlet boss 51 depending therefrom. The boss 51 has a lower or valve end 52 with a spherical surface and has a shoulder 53 adjacent the upper end 54. The web 41 has equally spaced tapped holes 55 around the upper end 54 of the boss 49. The web 43 also has a hollow right or outlet boss 56 depending therefrom to terminate in a lower or valve end 57 with a spherical surface. The boss 56 has a shoulder 58 adjacent the upper end 59 and a shoulder 60 adjacent the lower end. Equally spaced tapped holes 61 are provided in the web 43 around the boss 56. The bosses 51 and 56, each have a transverse boss 63 extending therefrom to the sidewall 41 with a passage 64 opening into the boss 56 and an internally threaded outer end 65 closed by plug 66. A block 67 located over the left boss 56 and in the annular groove 45, has a vertical hole 68 which opens the passage 64 in the left boss 63 to the space between the sidewall 41 and ridge 44. The case part 40 mounts in edge to edge contact with the lower barrel part 20 for receiving the inlet and outlet barrel valves 70 and 75 between the respective valve ends of the bosses.

The barrel valves 70 and 75 are provided for controlling fluid flow respectively through the inlet passage 12 and the outlet passage 13. The barrel valves 70 and 75 are similar in construction and will also be molded of a suitable material, such as plastic. The inlet barrel valve 70 has a ball 71 with an aperture 72 therethrough. A cylindrical handle 73 extends from the ball 71 at right angles to the axis of the aperture 72 and is of a suitable diameter to snuggly fit through the left hole formed by the left notches 23 and 42 to locate flats 74 on the outside of the body 11. The ball 71 is located between the spherical surfaces of the valve ends 27 and 52 of the inlet bosses 25 and 51 for rotation, via the flats 74 on the handle 73, between an open position wherein the aperture 72 is aligned with the hollow of the inlet boss pairs 25, 51 and a closed position wherein the aperture 72 is not aligned with and does not open to the hollow of the inlet boss pairs 25, 51 to control the flow through the inlet passage 11 defined thereby.

Likewise, the outlet barrel valve 75 has a ball 76 with an aperture 77 and a handle 78 extending therefrom to end in flats 79. The ball 76 is located between spherical surfaces of the valve ends 34, and 57 of the outlet bosses 32 and 56 with the handle 78 extending through the right hole formed by right notches 23, and 42 to locate the flats 79 outside the body 11. The outlet valve 75 is also rotatable between an open position and a closed position to control the flow through the outlet passage 14. The fluid flow, so manually controlled by the barrel valves 70 and 75, is also automatically controlled against backflow by the check valves 80 and 100.

The inlet check valve 80 is for permitting flow in one direction in the inlet passage 12 and for preventing flow in the other direction in the inlet passage 12. The inlet check valve 80 is a unit with the main divisions thereof being a seat 81, a piston 90 and a spring 96. The inlet seat 81 is seen in FIGS. 7 and 5 and in cross section in FIG. 1. The seat 81 has apertured ears 82, through which screws 83 are received to be threaded into tapped holes 55 to mount the seat 81 to the case part 40. The ears 82 have a depending tubular wall 84 with an outside diameter suitable to fit into the hollow of the inlet boss 51. A seal ring 85 is located on the shoulder 53 to seal the juncture between the wall 84 and the inlet boss 51. The tubular wall 81 has transversely extending cross members 86 with a central aperture 87 at the intersection of the cross members 86. The tubular wall has an upwardly and outwardly opening frustoconical inner surface 88 to complete the inlet seat 81 for receiving the piston 90 therein.

The piston 90 for this inlet check valve 80 is generally disk-shaped with an outwardly opening peripheral groove 91 for a seal ring 92. The piston 90 has a central aperture 93 into which is anchored a rod 94 extending through the aperture 87 in the seat 81 and terminating in a head 95. A spring 96 has a small or lower end seated against the head 95 and a large or upper end seated against the transverse members 86 to bias the piston downwardly against the seat 81 to close the inlet check valve 80 with fluid pressure on the underside of the piston 90 moving the piston upwardly against the biasing of the spring 96 to open the inlet check valve 80.

The important and unique feature of the inlet check valve 80 is the provision of the frustoconical inner surface 88 which cooperates with the sealing ring 92 in the piston 90 to wedge the sealing ring 90 between the seat 81 and piston 90 to seal the juncture therebetween. This wedging sealing action continues even as the seal ring 92 wears to provide a reliable seal between the piston 90 and seat 81. It would be possible to provide the frustoconical surface 88 on the piston 90 and the sealing ring 92 on the seat 81 and still provide these advantageous features of the inlet check valve 80.

An outlet check valve 100 is also provided on the case part 40 for permitting flow in one direction in the outlet passage 14 and for preventing flow in the other direction in the outlet passage 14. The outlet check valve 100 includes a seat 101, a piston 110 and a spring 117.

The seat 101 is seen in FIGS. 5 and 7 and in cross section in FIG. 1. The seat 101 has apertured ears 102 through which screws 103 are received to be threaded into tapped holes 62 for mounting the seat 101 to the case part 40. The ears 102 have a short depending tubular wall 104 of a diameter suitable to fit into the hollow outlet boss 56 with a seal ring 105 on the shoulder 58 closing the juncture therebetween. The ears 103 have transversely extending cross members 106 with an upwardly protruding post 107 having a central aperture 108 therein. The lower inner surface of the tubular wall has a downwardly and outwardly opening frustoconical inner surface 109 to complete the seat 101 ready to receive therein the piston 110.

The piston 110 for the outlet check valve 100 is generally disk-shaped and has an outwardly opening peripheral groove 111 with a sealing ring 112 therein. The piston 110 also has a central aperture 113 in which one end of a rod 114 is located while the other end of the rod 114 extends through the aperture 108 with a head 115 maintaining the rod 114 in the protruding post 107 to guide the movement of the piston 110. The piston 110 has a downwardly opening annular cavity 116 which seats the upper end of a spring 117 while the lower end seats against the lower shoulder 60 in the outlet boss 56. The spring 117 acts on the piston 110 to bias it upwardly against the seat 101 to a closed position while the flow of fluid acting on the top of the piston 110 will move the piston downwardly against the biasing of the spring 117 to an open position. Again the provision of the frustoconical inner surface 109 wedges the sealing ring 112 to seal the juncture between the piston 110 and the seat 101 to provide the previously described advantages which result from such a combination. The case part 40 with the inlet and outlet check valves 80 and 100 thereon as thus far described is now ready to receive the diaphragm housing part 130 and the diaphragm valve support housing part 150 thereon.

As seen in perspective in FIG. 7 and in vertical cross section in FIG. 1, the diaphragm housing part 130 is provided to join to the case part 40. The diaphragm housing part 130 has a cylindrical sidewall 131 with an outside diameter generally the same as the outside diameter of the sidewalls 41 and 22. The sidewall 131 has a vent notch 132 formed therein in the lower edge. A top wall 133 is formed between the cylindrical wall adjacent the upper edge thereof. The top wall 133 has a series of bolt hole bosses 134 provided therein adjacent the upper edge of the cylindrical sidewall 131. Each boss 134 has a vertical hole 135. The underside of the top wall 133 has depending cylindrical ridge 136 which is spaced slightly from the cylindrical sidewall 131. An exterior enlargement 137 is provided between the top wall 133 inside the ridge 130 and the upper edge of the sidewall 131 to define a passage 138 opening to the underside of the top wall 133 and to a joining passage 139 which opens to the space between the sidewall 131 and the ridge 136. The passages 138 and 139 are part of the interconnecting passage 17 which also includes a tube 140.

The tube 140 has ends of smaller diameter to provide shoulders 141 around which are received seal rings 142 to seal the junctures between the tube 140 and the parts 130 and 40. The tube 140 is completed by a central passage 143 extending from the upper end to the lower end to be part of the interconnecting passage 17. The diaphragm housing part 130 is now completely ready to receive therein, the diaphragm, valve support housing part 150.

Figure 4:
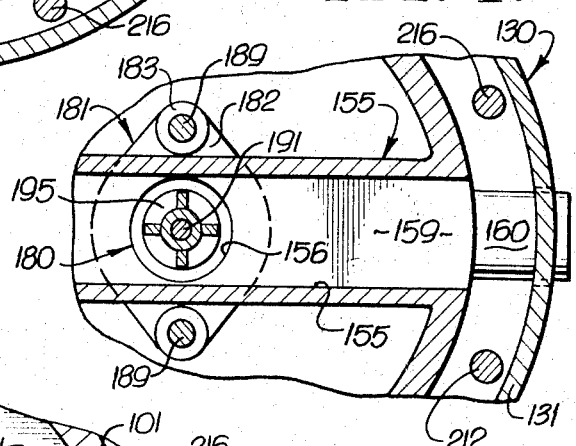
FIG. 4 is a fragmentary top cross-sectional view taken along the plane IV—IV of FIG. 1.

The diaphragm valve support housing part 150 is seen in perspective in FIG. 7, in vertical cross section in FIG. 1 and in horizontal cross section in FIGS. 3 and 4. The diaphragm valve support housing part 150 has a cylindrical sidewall 151 of a suitable diameter to be received inside of the ridge 136 in the diaphragm housing part 130. The sidewall 151 has an annular notch 152 in its lower edge to permit the sidewall 151 to fit between the annular ridge 44 in the case part 40. The upper edge of the sidewall 151 has an upwardly opening annular groove 153 and an inwardly extending annular shoulder 154 for a purpose which will appear later. The cylindrical sidewall 151 has a generally rectangular, hollow cross member 155 extending thereacross. The cross member 155 has a central hole 156 which is surrounded by upper and lower annular shoulders 157 and 158. The hollow cross member 156 has opposed radial passages 159 opening the central hole 156 to the outwardly facing surface of the sidewall 151. Just below the plane of the cross member 155 is a radially outwardly extending boss 160 with a passage 161 through the sidewall 151 and with a threaded outer end 162 closed by plug 163. The upper edge of the sidewall 151 adjacent and outside the groove 153 has an annular ridge 164 therein which provides space for receiving the diaphragm 170 while preventing the diaphragm 170 from being pinched.

The diaphragm valve support housing part 150 is provided to be positioned on the case part 40, with the lower edge of the sidewall 151 located inside the ridge 44 so that seal 47 can seal the juncture therebetween. Thereafter the diaphragm housing part 130 is located over the support housing part 150 with the diaphragm 170 located therebetween.

The diaphragm 170 is best seen in FIG. 1 and includes a rubber disk 171 with a downwardly extending annular lip 172 for insertion inside the ridge 164 and into the groove 153 in the cylindrical wall 151 of the support housing part 150. A diaphragm support 173 is centrally located on the disk 171 to prevent the inner portion of the disk 171 from flexing. The support 173 has a centrally located hole 174. The support 173 also has an outer downwardly protruding cylindrical ridge 175 for retaining one end of a spring 176 while the other end of the spring 176 seats against the cross member 155 to bias the diaphragm 170 upwardly. The diaphragm 170 is resiliently connected to the relief valve 180.

The relief valve 180 is best seen in FIGS. 1, 2, and 4, and includes a valve seat lower body portion 181, a valve seat upper body portion 185, a piston 190, and a resilient connecting means 200. The valve seat lower body portion 181 includes a plate 182 with a pair of upstanding posts 183 spaced so as to be received along the cross member 155. The plate 182 also has central hollow boss 184 sized to be received in the aperture 156 with a seal ring on the lower shoulder 158 closing the juncture therebetween.

The valve seat upper body portion 185 also has a plate 186 with a pair of downwardly protruding spaced posts 187 for joining with the posts 183. The plate 185 has a central hollow boss 188 sized to be received in the aperture 156 with a seal ring on the upper shoulder 157 closing the juncture therebetween. The valve seat upper body portion 185 is located on the upper side of the cross member 155 while the valve sat lower body portion 181 is located on the lower side of the cross member 155 so that the posts 187 and 183 may be joined by machine screws 189 to provide a valve seat for the piston 190.

A piston 190 is provided opening and closing the central hole 156 of the cross member 155. Piston 190 includes a vertical bolt 191 with a disk 192 adjacent the head thereof. Below the disk 192 is a seal washer 193 for sealing against the valve seat upper body portion 185. Below the seal washer 193 on the stem of the bolt 191 is a fluted guide 194 extending from the valve seat upper body portion 185 to the valve seat lower body portion 181 for having a disk 195 received on the lower end, below which a seal washer 196 is provided. A fluted guide end 197 is threaded to the lower end of the bolt 191 to hold the piston together. Piston 190 is movable in response to fluid pressure on its underside to a raised position wherein the fluid passes along the flutes and into the cross member passages 159, with the resilient connecting means 200 operably connecting the piston 190 of the relief valve 180 to the diaphragm 170 for being opened and closed thereby in response to differential fluid pressure applied to the diaphragm 170.

The resilient connecting means 200 is for operably connecting the relief valve 180 to the diaphragm 170 while allowing slight relative movement therebetween whereby upon sudden variations in the fluid pressure in the valve housing, the diaphragm can flex slightly without moving the relief valve and without thereby causing fluid spitting. In the preferred embodiment, the resilient connecting means 200 includes the provision of external threads 201 on the head of bolt 191 for threadably receiving the lower coils of a spring 202. The upper coils of the spring 202 thread into external threads 203 on a nut 204 turned onto machine screw 205 through hole 174 to operably connect the piston 190 of the relief valve 180 to the diaphragm 170. The spring 201 is of such a free length that it will expand to compensate for slight flexing of the diaphragm 170 due to sudden variations in the fluid pressure and yet upon flexure of the diaphragm 170 due to a leak past the outlet check valve 100, the spring 202 will pull open the relief valve 180 to exhaust the fluid and prevent a back pressure from being applied to the inlet check valve 80. The description of the parts of the body 11 is now completed, ready for the holding means 210 to secure the parts together into the body 11.

Holding means 210 is provided for holding the parts 20, 40, 130 and 150 together. In the preferred embodiment, the holding or fastening means 210 includes a first set of holding elements 211 for holding the parts 20, 40 and 130 together and a second set of holding elements 215 for holding the case part 40 and the diaphragm housing part 130 together and thereby aiding the first set of holding elements 211 in withstanding the higher pressures expected between the case part and the diaphragm housing part. As best seen in FIG. 6, the first set of holding elements include an upper bolt 212, a nut 213 and a lower bolt 214. The upper bolts 212 extend downwardly through every other bolt hole 135 in the diaphragm housing part 130 and through aligned bolt holes 48 in the case part 40 to thread into nuts 213 in the aligned nut bosses 49. The lower bolts 214 extend upwardly through every other bolt hole 24 in the lower barrel part 20 to thread into the nuts 213 to complete the first set of holding elements 211.

The second set of holding elements 215 include bolts 216 and nuts 217. The bolts 216 extend downwardly through the remaining bolt holes 138 in the diaphragm housing part 130 and through aligned bolt holes 48 in the case part 40 to thread into nuts 217 in the aligned nut bosses 49. Thus, in the body 11 of the preferred embodiment, eight bolts 212, 216 hold the diaphragm housing part 130 on the case part 40 while only four bolts 214 hold the lower barrel part 20 to the case part 40. Also, the four bolts 214 that hold the lower barrel part 20 to the case part 40 can be removed to free these two parts 20 and 40 without disturbing the rest of the parts.

The body 11 is assembled by first assembling the parts thereof. The inlet and outlet check valves 80 and 100 are secured as units of the case part 40 by screws 83 and 103. The valve seat lower body portion 181 and valve seat upper body portion 185 are assembled around the cross member 155 by screws 189 ready to receive the piston 190 therein. The diaphragm valve support housing part 150 is located on the case part 40, with the protruding post 107 engaging the cross member 155 for supporting and buttressing the valve 100. The piston 190 is located in the valve seat 181-185 of the relief valve 180 with the springs 176 and 202 extending upwardly ready to receive the diaphragm 170. The diaphragm 170 is positioned on the support housing part 150 with the lip 172 thereof inside the ridge 164 and extending into groove 153 ready to receive the screw 205 therethrough. The diaphragm housing part 130 is then positioned over the support housing part 150 with the boss 160 thereof extending out of the notch 132 and with the lower end of tube 140 extending into the vertical hole 68. The diaphragm housing part 130 seats against the case part 40 and the support housing 150. The two parts 130 and 140 receive bolts 212 and 126 to thread into nuts 213 and 217 to hold the two parts together. The barrel valves 70 and 75 are located on the upper ends 27 and 34 of the inlet and outlet bosses 25 and 32 respectively of the lower barrel part 20 with the handles 73 and 78 thereof extending oppositely through right and left notches 23. The lower barrel part 20 is placed against the case part 40 while bolts 214 are threaded into nuts 213 to complete the assembly of the body 11.

The body 11 is now ready to be connected to a source of fluid (not shown) and a receiver of fluid (not shown). It is contemplated that a pipe from the receiver of fluid will be threaded into the threads 33 of the outlet boss 32 while a pipe from the supply of fluid will be threaded into the threads 26 of the inlet boss 25. The fluid from the supply of fluid will pass along the inlet passage 12 which includes the hollow inlet boss 25, the left barrel valve aperture 72, and the inlet boss 51 and through the inlet check valve 80 to the intermediate chamber 13. The transverse hollow boss 28, when not closed by plug 31, will provide fluid at inlet passage pressure for whatever use it may be needed. The inlet barrel valve 70, upon manual rotation thereof, controls the fluid flow in the inlet passage 12.

The intermediate chamber 13 of the body 11 is defined by the web 43 of the case part 40 and the diaphragm valve support housing part 150 with the boss 160, when not closed by plug 163, providing fluid at intermediate chamber pressure for whatever use it may be needed. Typically the pressure in the intermediate chamber 13 will be less than the fluid pressure in the inlet passage 12 because of the pressure drop caused by the inlet check valve 80.

The fluid from the intermediate chamber 13 passes into the outlet passage 14 through the outlet check valve 100, the outlet boss 56, the ball aperture 77 of the outlet barrel valve 75 and the outlet boss 32 to the receiver of fluid. The right transverse boss 63, were it not closed by plug 66, would supply fluid at the outlet passage pressure. Typically, this outlet fluid pressure will be less than the intermediate chamber fluid pressure because of the pressure drop caused by the outlet check valve 100.

The diaphragm chamber 16 is defined by the top wall 133 of the diaphragm housing part 130 and the support housing part 150. The diaphragm 170 divides this chamber 16 into an inlet pressure portion 18 above the diaphragm 170 and an intermediate pressure portion 19 below the diaphragm 170. The interconnecting passage 17 interconnects the inlet pressure portion 18 with the inlet passage 12 and includes the passage 138, joining passage 139, central passage 143, the vertical hole 63, and passage 64. The difference in the inlet fluid pressure and the intermediate chamber fluid pressure when not balanced by spring 176 causes the diaphragm 170 to open the exhaust passage 15.

The exhaust passage 15 includes the relief valve 180, the passages 159 in the cross members 155 of the support housing part 150, the space between the support housing part 150 and the diaphragm housing part 130, the holes 48 through the case part 40 and the interiors of the case part 40 and lower barrel part 20 to finally vent to atmosphere through drain hole 35.

As long as the fluid pressure is greater in the inlet passage 12 than in the outlet passage 14, the fluid will flow from its source, through the inlet passage 12 opening inlet check valve 80 to flow into the intermediate chamber 13, opening outlet check valve 100 to flow through the outlet passage 14 to the receiver of fluid. If the fluid pressure in the outlet passage 14 approaches the fluid pressure in the inlet passage 12, then the check valves 80 and 100 will be closed by their springs 96 and 117, to wedge the seal rings 85 and 105 against the frustoconical sealing surfaces 88 and 109 to seal these junctures and separate the inlet passage 12 from the intermediate chamber 13 from the outlet passage 14.

If a sudden change occurs in the pressure of the fluid flowing through the valve body 11, the diaphragm 170 will flex because of the pressure differential caused thereby. In the prior art valves, such flexing of the diaphragm 170 would crack open the relief valve and the fluid would spit into the exhaust passage 15 causing noise and leakage. In the valve 10, of the present invention, the spring 201 expands to compensate for such limited flexing of the diaphragm 170 and keeps the relief valve 180 closed to eliminate spitting and its undesirable noise.

If the fluid pressure in the outlet passage 14 is greater than the fluid pressure in the intermediate chamber 13 and the inlet passage 12, the check valves 80 and 100 will remain closed to prevent backflow. However, after prolonged use, even the superior check valves 80 and 100 of this invention may fail. In the event of such failure, the fluid in the outlet passage 14 cannot be permitted to backflow into the inlet passage 12 and possibly contaminate the supply of fluid.

The diaphragm 170, being supplied with inlet fluid pressure through the interconnecting passage 17 which is balanced by the intermediate fluid pressure and by spring 176, will, as the intermediate fluid pressure approaches the inlet fluid pressure, be flexed by the spring 176 to raise the diaphragm 170 and the relief valve 180 via spring 200 to the open position. The open relief valve 180 joins the intermediate chamber 13 to the exhaust passage 15 to exhaust the fluid in the intermediate chamber 13 to atmosphere. Such action prevents a back pressure being applied to the inlet check valve 80 to cause the inlet check valve 80 to fail. When the pressure in the intermediate chamber 13 drops to its normal differential pressure with respect to the inlet pressure, the diaphragm 170 returns to close the relief valve 180 and return the valve 10 to normal operation.

Thus, the valve 10, according to this invention, can be attached between the potable water supply of a house and a sprinkler system, with a fertilizer adding apparatus therein. With the valve 10 so located, it is safe to add chemicals to the water downstream of the valve 10 without fear of contaminating the drinking water of the house. Further, because the valve 10 is molded, constructed of low-cost molded parts, it is inexpensive enough to be used for this purpose.

Having thus disclosed a preferred exemplary embodiment of the backflow preventing apparatus of the present invention:

I claim:

1. In a backflow preventing valve including
   a body having an inlet passage for connection to a source of fluid; an intermediate chamber fluidly connected to the inlet passage via an inlet check valve; an outlet passage fluidly connected to the intermediate chamber via an outlet check valve, and for connection to a receiver of fluid; an exhaust passage fluidly connected to the intermediate chamber via a relief valve and opening to atmosphere; a diaphragm chamber fluidly connected to the inlet passage and to the operating chamber; and a diaphragm in the diaphragm chamber to divide the diaphragm chamber into an inlet pressure portion and an intermediate pressure portion, said inlet pressure portion being in fluid communication with the inlet passage and said intermediate pressure portion being in fluid communication with the intermediate chamber, the improvement comprising the provision of:
   a resilient connecting means between the diaphragm and the relief valve for operably connecting the relief valve to the diaphragm while allowing slight relative movement therebetween, whereby upon variations in the fluid pressure in the valve housing, the diaphragm can flex slightly without moving the relief valve, but upon a leak of fluid from said outlet passage into said intermediate chamber, said diaphragm will flex beyond the limited amount allowed to move the resilient connecting means and cause the relief valve to open and exhaust the excess fluid to avoid possibly contaminating the fluid supply.

2. The invention as defined in claim 1 wherein the resilient connecting means includes a spring with one end attached to the relief valve and the other attached to the diaphragm.

3. The invention as in claim 1 wherein at least one of the check valves comprises:
   a valve seat member on the body and having a piston receiving opening therein,
   a valve piston member mounted on the body for movement relative to the seat member between open and closed positions,
   means for biasing the piston member to the closed position in the opening on the seat member, one of said members having a frustoconical sealing surface adjacent the other member, the other of said members having a sealing ring receiving grove opening generally toward the sealing surface, and
   a sealing ring in said groove for wedging sealing engagement with the frustoconical sealing surface when the piston is biased into the closed position.

4. The invention as in claim 3 wherein the one member is the seat and the other member is the piston.

5. The invention as defined in claim 1 wherein the body is constructed of a multiplicity of individual molded parts including a lower barrel part having bosses defining a spaced pair of passages therein, an upper barrel valve case part having bosses defining a similarly spaced pair of passages therein, said case part joining with the barrel part to join the passages therein, and means for holding the parts joined together.

6. The invention as defined in claim 5 wherein the parts are joined together along adjacent edges, wherein the adjacent ends of the bosses are spaced from each other, and additionally comprising valves located between the adjacent ends of the bosses for controlling the flow of fluid through the passages.

7. The invention as defined in claim 6 wherein the edges are suitably notched so as to provide holes when joined together and wherein the valve includes valve seats on the adjacent ends of the passages, an apertured ball between each pair of valve seats, and a handle extending from each apertured ball through the respective holes to the outside of the body, manual rotation of the handle rotating the ball between an open position wherein the aperture is aligned between the adjacent ends of the passage and a closed position wherein the aperture is not aligned with the adjacent ends of the passage to regulate the flow therethrough.

8. The invention as in claim 1 wherein the body is constructed of a multiplicity of individually molded parts including a case part having the inlet and outlet passages formed therein as well as a portion of an interconnecting passage formed therein and opening to the inlet passage; a diaphragm housing part having a cavity therein and being suitably shaped for joining to the case part to close the cavity, said diaphragm housing part having formed therein the rest of the interconnecting passage which opens into the cavity and which joins with the portion thereof in the case part to fluidly connect the inlet passage to the cavity; a diaphragm support housing part received in the cavity of the diaphragm housing part, said support housing part dividing the cavity into the intermediate chamber and the diaphragm chamber, said support housing part mounting the diaphragm to divide the diaphragm chamber into the inlet pressure portion into which the interconnecting passage opens, and the intermediate pressure portion, said support housing part having the exhaust passage therein and the relief valve mounted thereto with the resilient connecting means being located between the relief valve and the diaphragm; and means for holding the parts together.

9. The invention as in claim 8 wherein the diaphragm housing part includes a portion of the interconnecting passage which opens into the cavity and includes a tubular member therein which extends between the diaphragm housing part portion and the case part portion to fluidly connect the portions in the two parts.

10. The invention as in claim 8 wherein the check valves are located in the inlet and outlet passages and are secured to the case part, and wherein one of said valves has a protruding post which engages the diaphragm support housing part to define and buttress the closed position of the valve.

11. The invention as in claim 8 wherein the parts additionally include a lower barrel part suitably shaped for joining to the case part, and wherein the holding means includes a first set of holding elements for holding the barrel part, the case part and the diaphragm housing part together and a second set of holding elements for holding the case part and the diaphragm housing part together to aid the first set to withstand the higher pressures expected between the case part and the diaphragm housing part.

12. In a back flow valve, including
a body having an inlet passage for connection to a source of fluid; an intermediate chamber fluidly connected to the inlet passage via an inlet check valve; an outlet passage fluidly connected to the intermediate chamber via an outlet check valve and for connection to a receiver of fluid; an exhaust passage fluidly connected to the intermediate chamber via a relief valve, and opening to atmosphere; a diaphragm in the diaphragm chamber dividing the diaphragm chamber into an inlet pressure portion and an intermediate pressure portion, said inlet pressure portion being fluidly connected to the inlet passage and said intermediate pressure portion being fluidly connected to the intermediate chamber; and means for connecting the relief valve and the diaphragm together, the improvement comprising the provision of
a body constructed of a multiplicity of individual molded parts including a case part having the inlet and outlet passages formed therein as well as a portion of an interconnecting passage formed therein and opening to the inlet passage; a diaphragm housing part having a cavity therein and being suitably shaped for joining to the case part to close the cavity, said diaphragm housing part having formed therein the rest of the interconnecting passage which opens into the cavity and which joins with the portion thereof in the case part to fluidly connect the inlet passage to the cavity; a diaphragm support housing part received in the cavity of the diaphragm housing part, said support housing part dividing the cavity into the intermediate chamber and the diaphragm chamber, said support housing part mounting the diaphragm to divide the diaphragm chamber into the inlet pressure portion into which the interconnecting passage opens, and the intermediate pressure portion, said support housing part having the exhaust passage therein and the relief valve mounted thereto; and means for holding the parts together.

13. The invention as in claim 12 wherein the diaphragm housing part includes a portion of the interconnecting passage which opens into the cavity and includes a tubular member therein which extends between the diaphragm housing part portion and the case part portion to fluidly connect the portions in the two parts.

14. The invention as in claim 12 wherein the check valves are located in the inlet and outlet passages and as secured to the case part, and wherein one of said valves has a protruding post which engages the diaphragm support housing part to buttress the closed position of the valve.

15. The invention as in claim 12 wherein the parts additionally include a lower barrel part suitably shaped for joining to the case part, and wherein the holding means includes a first set of holding elements for holding the barrel part, the case part and the diaphragm housing part together and a second set of holding elements for holding the case part and the diaphragm housing part together to aid the first set to withstand the higher pressures expected between the case part and the diaphragm housing part.

16. The invention as defined in claim 12 wherein the parts additionally include a lower barrel part having bosses defining a spaced pair of passages therein, and wherein the upper barrel valve case part has similarly spaced bosses defining a pair of passages therein, said case part joining with the barrel part to join the passages therein.

17. The invention as defined in claim 16 wherein parts are joined together along adjacent edges, wherein the adjacent ends of the bosses are spaced from each other, and additionally comprising valves located between the adjacent ends of the bosses for controlling the flow of fluid through the passages.

18. The invention as defined in claim 17 wherein the edges are suitably notched so as together to provide holes, and wherein the valve includes valve seats on the adjacent ends of the passages, and apertured ball between each pair of the valve seats, and a handle extending from each apertured ball through the respective hole to the outside of the body, manual rotation of the handle rotating the ball between an open position wherein the aperture is aligned between the adjacent ends of the passage and a closed position wherein the aperture is not aligned with the adjacent ends of the passages to regulate the flow therethrough.

19. The invention as in claim 12 wherein at least one of the check valves comprises a valve seat member on the body and having a piston receiving opening therein, a valve piston member mounted on the body for movement relative the seat member between open and closed positions, means for biasing the piston member to the closed position in the opening on the seat member, one of said members having a frustoconical sealing surface adjacent the other member, the other said members having a sealing ring receiving groove opening generally toward the sealing surface and a sealing ring in said groove for wedging sealing engagement with the frustoconical sealing surface when the piston is biased into the closed position.

20. The invention as in claim 12 wherein the means for connecting the relief valve to the diaphragm include, spring means with one end attached to the relief valve and the other end attached to the diaphragm, said spring means changing its length upon slight changes in the fluid pressure in the valve to hold the relief valve closed and thereby prevent these slight pressure changes from causing fluid to spit into the exhaust passages.

21. A check valve for a valve body comprising a valve seat member on the body and having a piston receiving opening therein, a valve piston member mounted on the body for movement relative the seat member between open and closed positions, means for biasing the piston member to the closed position in the opening on the seat member, one of said members having a frustoconical sealing surface adjacent the other member, the other of said members having a sealing ring receiving groove opening generally toward the sealing surface, and a sealing ring in said groove for wedging sealing engagement with the frustoconical sealing surface when the piston is biased into the closed position.

22. In a backflow preventing valve including an inlet passage, an outlet passage, an intermediate passage between the inlet and outlet passages, a relief valve selectively venting the intermediate passage to atmosphere, and a diaphragm with inlet pressure supplied to one side thereof and with intermediate passage pressure supplied to the other side thereof, the improvement comprising the provision of a resilient connecting means between the diaphragm and the relief valve for operably connecting the relief valve to the diaphragm while allowing slight relative movement therebetween, whereby upon variations of fluid pressure, the diaphragm can flex slightly without moving the relief valve, but upon a leak of fluid from the outlet passage into the intermediate passage, said diaphragm will flex beyond the limited amount allowed to move the resilient connecting means and cause the relief valve to open and exhaust the excess fluid to avoid possibly contaminating the fluid supply.

* * * * *